I. J. YOUNG.
AUTOMATIC MACHINERY FOR MAKING SPLIT PINS.
APPLICATION FILED JUNE 27, 1910.
1,151,645.
Patented Aug. 31, 1915.
3 SHEETS—SHEET 3.
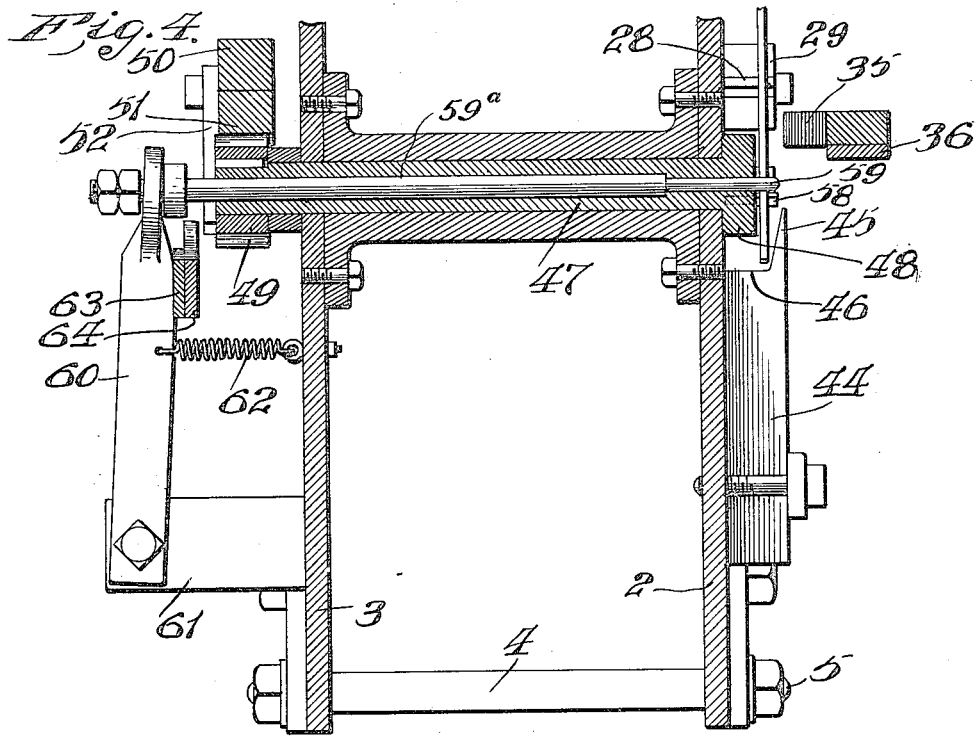
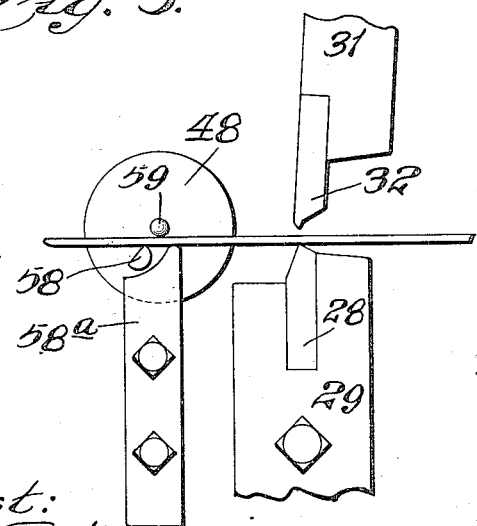
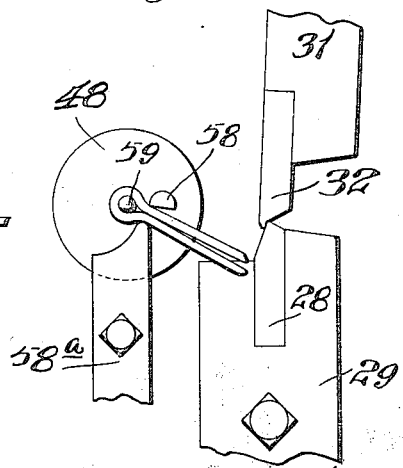
Attest:
H. G. Fletcher.
E. L. Wallace.
Inventor:
Ira J. Young.
By Higdon & Longan
Attys.

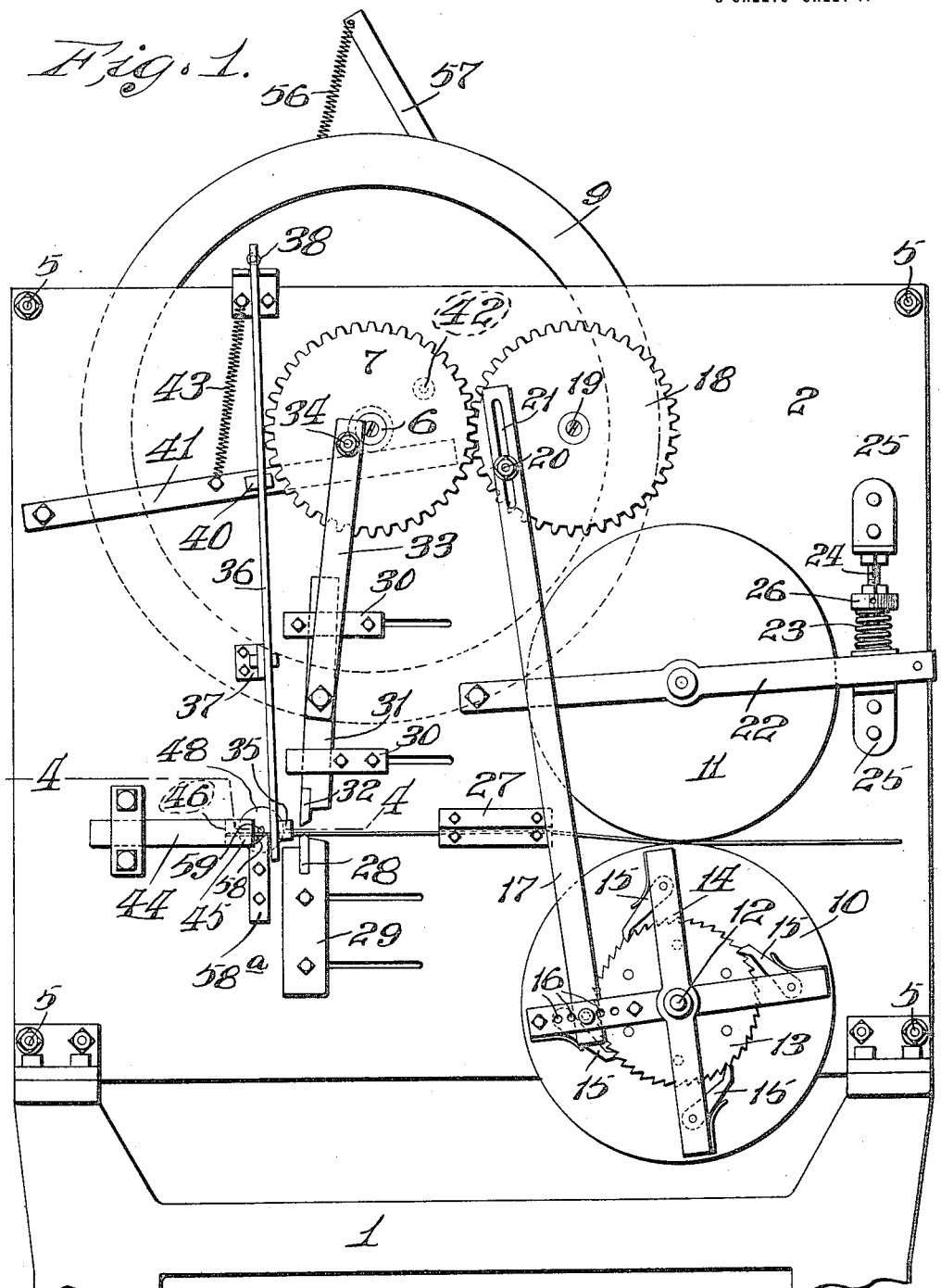

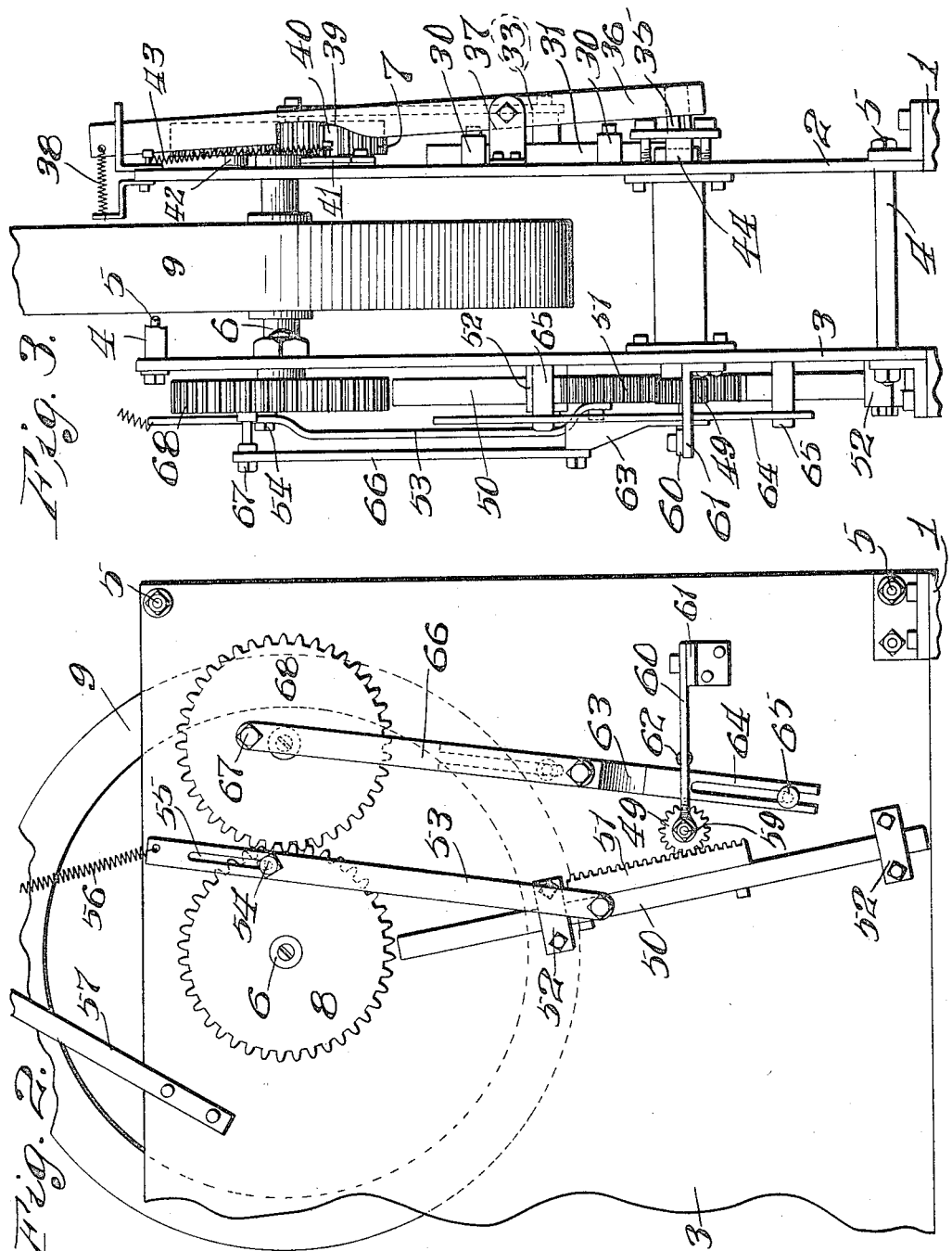

UNITED STATES PATENT OFFICE.

IRA J. YOUNG, OF ST. LOUIS, MISSOURI, ASSIGNOR TO WESTERN WIRE PRODUCTS COMPANY, OF ST. LOUIS, MISSOURI, A CORPORATION OF MISSOURI.

AUTOMATIC MACHINERY FOR MAKING SPLIT PINS.

1,151,645. Specification of Letters Patent. Patented Aug. 31, 1915.

Application filed June 27, 1910. Serial No. 569,019.

*To all whom it may concern:*

Be it known that I, IRA J. YOUNG, a citizen of the United States, and resident of St. Louis, Missouri, have invented certain new and useful Improvements in Automatic Machinery for Making Split Pins, of which the following is a specification containing a full, clear, and exact description, reference being had to the accompanying drawings, forming a part hereof.

My invention relates to improvements in automatic machinery for making split pins, the object of my invention being to construct an automatic machine for forming split pins from half-round wire and comprises a wire feed, a wire cutter, pin forming devices and means whereby the operation of the various elements are timed to act at proper and regular intervals.

For the above purposes my invention consists in certain novel features of construction and arrangement of parts as will be hereinafter more fully described, pointed out in the claims and illustrated by the accompanying drawings, in which—

Figure 1 is an elevation of the machine proper, a portion only of the base of the machine being shown; Fig. 2 is an elevation illustrating the operative parts of the machine on the side opposed to that illustrated in Fig. 1; Fig. 3 is a rear elevation, a portion of the operating pulley being broken away; Fig. 4 is an enlarged, detail sectional plan view taken approximately on the line 4—4 of Fig. 1; Fig. 5 is an enlarged, detail elevation illustrating the operative positions of the cutting members, and pin forming devices just after a predetermined length of half-round wire has been fed; and Fig. 6 is a view similar to Fig. 5 showing the same parts in positions completing the formation of a pin.

Referring by numerals to the accompanying drawings: 1 designates the base of the machine which may be of any desired construction.

2 and 3 designate the plates constituting the uprights which are spaced and held apart by a number of sleeves 4 and held together by bolts 5.

6 designates the main driving shaft journaled in bearings formed in the plates 2 and 3.

Keyed or otherwise secured to the shaft 6 outside the plate 2 is the gear wheel 7 and keyed to the opposite end of the shaft 6 outside the plate 3 is a gear wheel 8. The gear wheel 7 is arranged to operate a cutting mechanism and feeding mechanism hereinafter described and the gear wheel 8 arranged to operate the pin forming devices hereinafter described. Carried by the shaft 6, between the plates 2 and 3, is a pulley 9 which is embraced by a belt (not shown) for driving the machine.

The wire feeding mechanism comprises a pair of disks 10 and 11, the disk 10 being mounted for rotation on a stub-shaft 12 projecting from the left hand side of the plate 2 and located adjacent the lower right hand corner of the machine. Secured to the outer face of the disk 10 is a ratchet wheel 13. Carried by and arranged for rotation upon the shaft 12 is a four-armed spider 14, each arm of which carries a spring held pawl 15 arranged for engagement with the ratchet wheel 13. One of the arms 14 is provided with a plurality of perforations 16 for the connection therewith of a pitman 17. Meshing with the gear 7 is a gear wheel 18 carried by a stub-shaft 19 and which wheel is provided with a wrist pin 20 which connects with the pitman 17 through the slot 21. The disk 11 of the feed is carried on an arm 22 which is pivotally connected with the plate 2 and at its free end the arm 22 is engaged by an extensile coil spring 23 which spring embraces a threaded rod 24 supported in the brackets 25.

26 designates an internally threaded nut embracing the threaded rod 24 and bearing against the spring, which nut provides a means for adjusting the tension of the spring. As shown in Fig. 1 of the drawing, the material from which the pins are formed passes between the disks 10 and 11.

27 designates a wire straightener located adjacent the feeding means through which the wire passes before reaching the cutting and forming means. The cutting means comprises a fixed cutting member 28 supported in a block 29 which is adjustable laterally.

30 designates keepers adjustable laterally, through which keepers operates a bar 31 carrying a cutting member 32. Pivotally connected with the bar 31 is a pitman 33 which connects with the gear wheel 7 by means of the wrist pin 34. For directing the wire after it passes the cutting members and for placing it in position to be acted upon by the forming means is a block 35 in which there is a tapering groove. The block 35 is carried by an arm 36 pivotally mounted on a bracket 37 so that the block 35 may be moved outwardly away from the path of travel of the wire. At the upper end of the arm 36 there is a contractile coil spring 38 for normally holding the block 35 outwardly. Above the pivotal point of the arm 36 there is a cam face 39 arranged to be engaged by a projection 40 (see Fig. 3) carried by an arm 41 pivotally connected with the frame, which arm is engaged at regular intervals by a projection 42 on the inner face of the gear wheel 7. For holding the arm 41 in its normal position there is a contractile coil spring 43. In addition to the block 35, for directing the wire to its proper position in the forming means, there is a stop 44 the forward end of which is provided with a wedge shaped projection 45, the point of which lies outside of the normal path of travel of the wire and is shaped so that the wire will be forced inwardly toward the machine and the forward end 46 of the stop is arranged to limit the forward movement of the wire in case the feeding mechanism is not properly adjusted. A portion of the forming mechanism includes a hollow shaft 47 which is journaled in suitable bearings formed in the plates 2 and 3, and formed on the forward end of this shaft, outside the plate 2, is a head 48. Fixed in any suitable manner on the opposite end of this shaft 47 is a pinion 49.

50 designates a bar carrying a rack 51, which rack is in mesh with the pinion 49. For supporting the bar 50 there are keepers 52 secured to the plate 3 of the frame. For moving the bar 50 and rack 51 longitudinally there is a pitman 53 pivotally connected at its lower end to the bar 50 and at its opposite end with a wrist pin 54, carried by the gear wheel 8, there being a slot 55 in the pitman through which the wrist pin operates.

56 designates a contractile coil spring connected with the upper end of the pitman 53 and to a spring-support 57 connected with the frame, the spring being arranged to normally hold the pitman 53 in such position that the wrist pin 54 will be at the lowermost end of the slot 55. Carried by the outer face of the head 48 of the tubular shaft 47 is a projection 58 which is substantially semicircular in cross section, the flat face of which is substantially on a radial line from the center of the head 48.

58ª designates a fixed forming member which coöperates with the projection 58, as shown in Figs. 5 and 6, the upper end of the fixed forming member being shaped to permit the projection 58 assuming the position shown in Fig. 5, while its extreme upper end terminates at a point within the arc described by the innermost corner of the projection 58.

Mounted to rotate with and to slide longitudinally within the hollow shaft 47 is a spindle 59ª, the forward end of which is reduced in diameter to form a center pin 59 around which the eye of the split pin is formed, and this center pin 59 normally projects beyond the head 48. For moving the spindle and center pin longitudinally relative the shaft a sufficient distance to withdraw the forward end within the head 48 for purposes which will be hereinafter made clear, I have provided the lever 60 which is connected with the rear end of the spindle and is pivotally mounted on a bracket 61 secured to the plate 3, there being a contractile coil spring 62 connected with the lever for normally holding the center pin to project through the head 48. For engaging the lever 60 to actuate the same and draw the center pin into the head 48 there is a wedge shaped block 63 which is carried by a bar 64 slotted at each of its ends and held and guided in place by the posts 65. Connected with the wedge shaped block 63 is a pitman 66 pivotally connected to a wrist pin 67 projecting laterally from a gear wheel 68 meshing with the gear wheel 8.

In the practical operation of the machine a strand of wire, from a supply (not shown), is passed between the feeding disks 10 and 11 through the straigthener 27 and rested upon the fixed cutting member. Motion is then imparted to the machine by means of the pulley 9, the initial operation being the cutting of the end of the wire so that the end of the wire tapers from the half-round side outwardly toward the flat side. In this connection it is to be understood that all of the cuts are made in this manner so that the ends of all of the split pins are wedge shape so they may be readily introduced where desired. After the cut has thus been made, through the medium of the gear wheels 7 and 18, the feeding mechanism is set in motion and a predetermined length of wire fed to the forming means. Through the medium of the gear wheel 8 and pitman 53 the rack-bar 51 is actuated and thus rotates the gear wheel 49, thereby rotating the shaft 47 and moving the projection 58 around the center pin 59, the action of which projection 58 is clearly illustrated in Figs. 5 and 6. As hereinafter described the center pin 59 is mounted to rotate with and to move lengthwise into the head 48 and thus when the lug or projection 58 engages the length of wire of which the split pin is formed and bends the same around the center pin to form the eye of the split pin the center pin moves or rotates synchronously with the head 48 and projection 58 thereby overcoming any tendency of the wire or material of which the split pin is formed to "creep", and therefore a perfect eye is formed in the center of the length of wire, and both legs of the pin are straight and of the same length. I have demonstrated in practice that where the center pin is fixed and does not move with the coöperating parts the legs of the split pin will be formed of uneven lengths by reason of the creeping of the wire around the stationary pin. Just prior to the final completion of the split pin the movable cutting bar 31 is operated and the split pin is cut from the wire.

During the time of the cutting and forming operations the feeding mechanism is inoperative, by reason of the slotted connection between the pitman 17 and wrist pin 20 of the gear wheel 18. To return the projection 58 to its initial position, shown in Fig. 5, the movement of the rack-bar 51 is reversed, that is the rack bar 51 is retracted by the spring 56 and the pitman 53 moved to the other limit of its pin and slot connection with the gear wheel 8. It is to be noted that the connection between the pitman 53 and the gear wheel 8 is a connection similar to the connection just described of the pitman 17 and gear wheel 18, that is a "pin and slot" connection, so that the forming devices will be inactive at a time when the feeding mechanism is operating. Immediately after the split pin is completely formed the wedge shaped block 63 is moved to a position engaging with the lever 60, thus moving the lever outwardly so as to draw the center pin in a position with its operative end wholly within the head 48 of the former, thus permitting the completed split pin to fall away from the forming device. In this manner the split pins are formed from a continuous piece of half-round wire, all of the operations being automatic and timed with relation to each other.

The completed pin is formed by a single arcuate movement of the projection 58 and the forming of the eye in the center of the length of wire is accomplished without extraneous means for holding the wire. The end of the legs of the pin, immediately adjacent the eye, bears against the fixed support 58ª while the lug or projection 58 engages the central portion of the length of wire and bends the same around the center pin 59. The feeding mechanism comprising the disks 11 and 12 moves the end of the wire or that portion thereof to be formed into the split end directly over the fixed support 58ª and the lug or projection 58 and beneath the center pin 59. The head 48 carrying the projection 58 is now partially rotated to form the eye in the center of the length of wire, and prior to the completion of the partial rotary movement of the parts 48 and 58 the length of wire is cut between the parts 28 and 32, and immediately thereafter the center pin 59 is withdrawn thereby releasing the completed split pin and permitting same to discharge from the forming means. The lug or projection 58 in operation engages the free end of the wire and bends the same around the center pin to form the eye of the split pin, and at the end of the arcuate movement of said lug or projection, the legs of the split pin are forced into contact with one another. The lug or projection is now exerting pressure upon the fixed member 58ª through the sides of the split pin, and such pressure forms the reverse bends between the legs of the pin and the eye. Thus it is absolutely necessary that the length of wire which forms the split pin be cut from the main body of the wire, before the member 58 exerts pressure upon the fixed member through the parts of the wire forming the neck between the eye and the legs of the completed pin. In this manner a split pin is formed which has legs of equal length, which fit snugly against one another, said legs being united at one end by a substantially round eye, and which form of split pin is especially desired for use in various mechanical constructions, for the reason that the parallel, close-fitting legs can be easily inserted in an aperture of proper size.

The fixed support 58ª is an essential part of the forming mechanism for the reason that it supports the length of wire while the same is being bent to form the split pin, and the forming end of said support opposes the pressure of the lug or projection 58 when the legs of the split pin are forced into contact with one another, and while the lug or projection 58 is pressing upon one of the legs of the split pin the forming end of the fixed support or former 58ª is bearing against the opposite leg at the point where the same unites with the eye of the split pin, and thus the neck or reverse bends which unite the eye with the legs are formed.

One of the improved features of my invention is the mounting of the spindle 59ª within the hollow shaft 47, so that when said hollow shaft 47 is positively rotated, first in one direction and then in a reverse direction by the engagement of the rack 51 with the pinion 49, it necessarily follows that the spindle and center pin will likewise be positively rotated in both directions synchronously with the hollow shaft, and at the proper time the wedge 63 engages the lever 60 and moves the spindle 59ª and center pin 59 lengthwise with respect to the hollow shaft 47 and parts carried thereby.

The various parts of my improved machine are of such relative sizes and are so timed in operation as to completely form one of the split pins with each complete revolution of the pulley 9, that is, the proper length of wire is fed forward by the disks 10 and 11, the cutting mechanism is actuated and the forming means is actuated to form a complete split pin from the severed length of wire during one complete revolution of the pulley 9.

It will be readily understood that minor changes in the size, form and construction of the various parts of my improved machine can readily be made and substituted for those herein shown and described without departing from the spirit of my invention, the scope of which is set forth in the appended claims.

I claim:

1. In a machine for making split pins a wire feeding means, a cutting mechanism, a wire forming mechanism comprising a rotatable center pin, and an element arcually movable about said center pin, and gear devices arranged to time the operations of said parts so that the feeding means will first act to move a piece of wire a predetermined length, then move the arcually movable element of the forming mechanism and during the movement of said arcually movable element operate the cutting mechanism.

2. In a machine for making split pins a wire feeding means, a cutting mechanism, a wire forming mechanism comprising an axially movable and rotatable center pin and an element arcually movable about said center pin, and gear devices arranged to time the operations of said parts so that the feeding means will first act to move a piece of wire a predetermined length, then move the arcually movable element and during the movement of said arcually movable element operate the cutting mechanism, and finally move the center pin axially to release the split pin.

In testimony whereof, I have signed my name to this specification, in presence of two subscribing witnesses.

IRA J. YOUNG.

Witnesses:
N. G. BUTLER,
E. L. WALLACE.

Copies of this patent may be obtained for five cents each, by addressing the "Commissioner of Patents, Washington, D. C."